Figure 1:
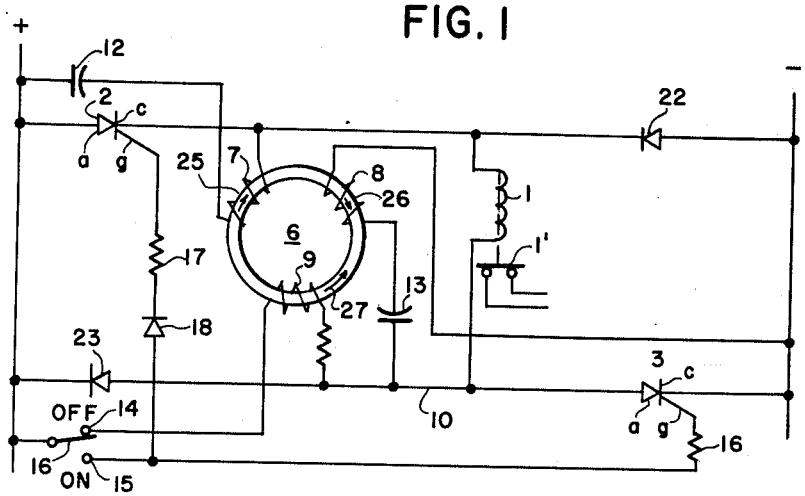

May 5, 1964  L. R. FOOTE  3,132,294
MOTOR COMMUTATOR UTILIZING CONTROLLED RECTIFIERS
Filed May 29, 1961                                    2 Sheets-Sheet 1

INVENTOR.
LAWRENCE R. FOOTE
BY *Merton D Moore*
ATTORNEY

May 5, 1964  L. R. FOOTE  3,132,294
MOTOR COMMUTATOR UTILIZING CONTROLLED RECTIFIERS
Filed May 29, 1961  2 Sheets-Sheet 2

INVENTOR.
LAWRENCE R. FOOTE
BY Merton D Moore
ATTORNEY

United States Patent Office 3,132,294
Patented May 5, 1964

3,132,294
MOTOR COMMUTATOR UTILIZING
CONTROLLED RECTIFIERS
Lawrence R. Foote, Roanoke, Va., assignor to General
Electric Company, a corporation of New York
Filed May 29, 1961, Ser. No. 113,511
4 Claims. (Cl. 318—138)

My invention relates to control circuits and particularly to such circuits utilizing solid state controlled rectifiers.

These rectifiers, now well-known in the art, and disclosed in detail in the "Controlled Rectifier Manual" published by Semiconductor Products Department, General Electric Company, Liverpool, New York, are finding wider application. They involve solid state unidirectional conducting devices having gate electrodes to which positive potential may be applied to render the device conductive. When so rendered conductive the solid state device remains conductive until interruption of operating potential between its anode and cathode. In this respect its operation is similar to that of a grid controlled gaseous discharge device commonly called a thyratron, but it has important, now well recognized, advantages thereover.

An object of my invention is to provide new and improvide circuits combining such rectifiers with saturable reactors and condensers to effect improved operation of contactors, pulsed field coils of dynamo electric apparatus and the like.

In accord with my invention a load device, which may be the actuating winding of a contactor, or the field coil of a dynamo electric machine, may have its opposite terminals connected of a source of operating potential through respective similarly poled controlled rectifiers and may be energized by application of a suitable gate potential to the gate electrodes of such rectifiers.

Each rectifiers is shunted by a respective winding on a common saturable reactor in series with respective capacitors. These capacitors charge from the power source through the load and the respective windings when the rectifiers are nonconductive. When the controlled rectifiers become conductive the capacitors discharge through the respective reactor windings and controlled rectifiers, the windings producing aiding saturating flux in the reactor which remains after the discharge is completed.

To turn the rectifiers off, means are provided to reverse the direction of flux in the reactor. This change in flux continues until the reactor is saturated in the opposite direction and induces a potential in the respective windings which charges the condensers in the reverse direction. When this flux reaches saturation in the windings have low impedance with the result that the reversed potential on the charged condensers is applied across the rectifiers and renders them nonconductive.

If desired, and as will later be described, a number of such control systems may be applied to the respective field coils of a dynamo electric machine and operated in succession thereby to produce successive energization of the field coils and a rotating field within the machine which may drive the rotor of the machine.

By reversal of the order of operation of the control system the dynamo electric machine may be reversed. In this way a continuous unidirectional source of power may be utilized to produce in the motor a rotating magnetic field to cause rotation of the armature in either direction. This avoids the use of any alternating current source and complicated rectifying and reversing systems and attendant difficulties, yet provides efficient operation and control of the motor both as to direction and speed of rotation.

Figure 2:
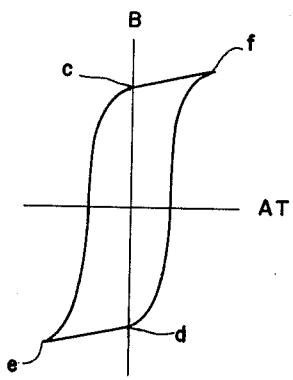
Figure 3:
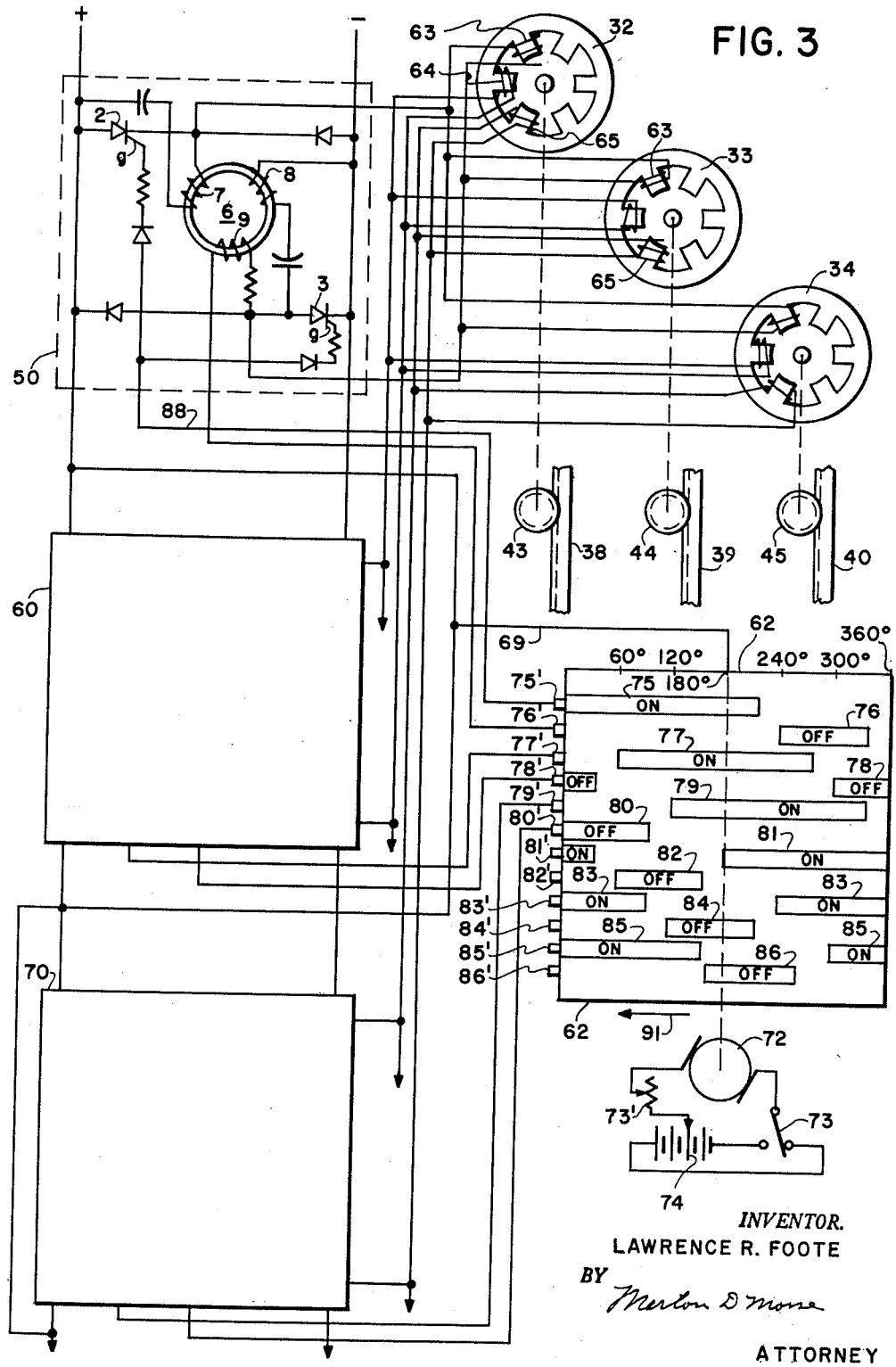

The novel features which I believe to be characteristic of my invention are set forth with particularity in the appended claims. My invention, itself, however, both as to its organization and method of operation, together with further objects and advantages thereof may best be understood by reference to the following description taken in connection with the accompanying drawing in which FIG. 1 represents an embodiment of my invention; FIG. 2 represents a hysteresis loop which may be characteristic of the saturable reactor employed therein; and FIG. 3 represents my invention as applied to the low frequency operation of certain motors.

Referring to FIG. 1, I have shown my invention as applied to the operation of a simple relay, or contactor, having an actuating winding 1 and contact 1'. The winding of this relay has its upper terminal, as shown on the drawing, connected to the positive terminal of a source of unidirectional electromotive force through a gate controlled rectifier 2, and said winding has its lower terminal connected to the negative terminal of the source through a similar gate controlled rectifier 3, these rectifiers being poled, when conductive, to pass current from the source through the relay winding 1.

These controlled rectifiers may be of the ordinary silicon type now commonly referred to as silicon controlled rectifiers and which are described in the above-referred to "Controlled Rectifier Manual" published by General Electric Company, Semiconductor Products Department, Liverpool, New York. Each of these rectifiers has an anode $a$, a cathode $c$ and a gate electrode $g$, the latter of which, when rendered positive, causes the rectifier to become conductive between its anode and cathode. Thereafter, the positive potential on the gate electrode may be removed and the rectifier still remains conductive until operating potential between its anode and cathode is interrupted, when it again becomes nonconductive and remains nonconductive until positive potential is again supplied to the gate electrode. In these respects its operation is similar to that of the grid controlled gaseous discharge device known as the thyratron.

These silicon controlled rectifiers are controlled by means of a saturable reactor 6 having windings 7, 8, and 9. The winding 7 is connected through a condenser 12 across the anode and cathode of the controlled rectifier 2.

The winding 8 is connected through condenser 13, across controlled rectifier 3. The winding 9, which is the primary winding, is connected between the anode of rectifier 3 and the positve terminal of the unidirectional potential source. This latter connection is through contacts 14 and 16 of an Off-On switch, the contact 14 being engaged when the switch is in its "Off" position.

The Off-On switch contact 16 has an alternate position bearing the legend "On" where it engages contact 15, which is connected to the gate electrode $g$ of the two controlled rectifiers through resistances 16 and 17, respectively.

The connection of contact 16 to the gate $g$ of rectifier 2 also includes a unilateral conducting device 18. A unilateral conducting device 22 is also connected between the upper terminal of the winding 1 of the relay and the negative terminal of the source of operating potential, and a unilateral conducting device 23 is connected between the lower terminal of winding 1 and the positive terminal of the source of operating potential. These unilateral conducting devices 18, 22, and 23, are not of the controlled type and the latter two are poled to be nonconductive to the potential of the source. Their purpose in the circuit is explained hereinafter.

As thus constructed the operation of the device is as follows. Assuming first that the controlled rectifiers 2 and 3 are nonconducting; condensers 12 and 13 are charged from the source of operating potential through a circuit extending from the positive terminal of that source through condenser 12, winding 7, relay winding 1, conductor 10, condenser 13 and winding 8 to the negative terminal of the source. Thus, both condensers charge with that electrode which is connected to the adjacent winding of the saturable reactor 6 negative with respect to the opposite electrode. The conductor 10 is at a potential determined by the capacitance of the two condensers.

Now let us suppose the switch contact 16 be momentarily operated to the On position. This supplies a current pulse to the gate electrodes $g$ of the controlled rectifiers rendering them both conductive. Current then passes through the two controlled rectifiers 2 and 3 and through the winding 1, thereby energizing the relay.

The rendering of the two controlled rectifiers conductive causes the associated condensers 12 and 13 to discharge through the respective windings 7 and 8 causing saturation of the core on which these windings are wound and producing a remanence flux in the directions of the arrows 25 and 26 which remains after the pulse is terminated.

That is, the saturable core of this reactor has a hysteresis loop which may be represented by the graph in FIG. 2, in which ampere turns are plotted as abscissae and flux density as ordinates. The windings may be so proportioned that, in response to discharge of the condensers, flux is produced corresponding to the point $e$ on the hysteresis loop. Following this discharge the flux may have the remanence value indicated at $d$.

Having been energized the relay winding remains energized whether or not switch contact 16 is left in engagement with contact 15 because the rectifiers remain conductive until potential applied between the anode and cathode is removed.

If it now be desired to deenergize the relay 1, switch contact 16 may be operated to its Off position, thereby energizing coil 9 and reversing the flux in the core of reactor 6, as indicated by the arrow 27. The flux now has the value indicated at $f$ in FIG. 2 and assumes the value $c$ when this switch is opened. This reversal of flux induces electromotive force in windings 7 and 8 which charges the condensers 12 and 13 in the opposite direction, i.e., with their electrodes which are directly connected to their associated winding positive with respect to the opposite electrode. When the reactor saturates, these windings become of low impedance and this positive potential is supplied to the cathode of the associated controlled rectifier, thereby rendering both rectifiers 2 and 3 nonconductive. The condensers then discharge adding their discharge current to the current in the load, and they become charged in the opposite direction through winding 1 as before, in readiness for a further operation of switch contact 15 to its On position.

When the controlled rectifiers become nonconductive a path must be provided for continued flow of current through the inductance since the inductive reactance of the relay winding 1 tends to continue the flow of current. This path is provided by rectifiers 22 and 23 connecting opposite terminals of winding 1 to respective terminals of the source. This not only permits the continued flow of current but provides full line voltage in opposition to it thereby to attenuate it rapidly.

This invention, as described, has utility in many applications. FIG. 3 illustrates it as applied to the low frequency synchronous control of a plurality of motors 32, 33, 34, etc., which may be used for operation of the control rods of atomic reactors, for example, or other devices which may be employed in areas exposed to undesired radiation. These control rods may be provided with racks 38, 39, 40 with cooperating gears 43, 44, 45, which may be mounted upon the shafts of, or otherwise driven by, motors 32, 33, 34, through mechanical drive connections not affected by radiation.

The dotted rectangle 50 shows my invention as described in connection with FIG. 1, except that the winding 1 is replaced by the field winding 63 of each of the motors 32, 33, 34, and others all in parallel, and the switch 16 is replaced by appropriate contacts on a drum controller 62. The rectangles 50, 60, 70, and others not shown, one for each field coil on motors 32, 33, 34, represent equipment identical to that shown in rectangle 50.

These motors 32, 33, 34 may comprise magnetic stators having a plurality of poles arrayed about a rotor, each pole carrying a winding 63, 64, 65, to produce in response to successive energization thereof a rotating magnetic field in the rotor and rotation of the rotor.

The number of poles and associated windings employed in the motors may vary, but as illustrated, six poles are shown in each motor and each may be assumed to be provided with a corresponding winding connected in the fashion of those illustrated. Associated with each winding are equipments represented by the rectangles 50, 60, 70, etc., there being as many of these equipments as there are field windings on the motors and all of these equipments being identical.

The Off-On switch of FIG. 1 in each of equipments 50, 60, 70, is replaced by corresponding contacts of the drum switch 62 driven by a motor 72.

This drum switch 62 is represented by a rectangle which is a projection of the outer cylindrical surface of the drum on the plane of the paper, showing the arrangements of the contacts on the surface of the drum. This drum is arranged to be driven by a motor 72 in a direction dependent upon the position of a reversing switch 73 which supplies voltage of one polarity or the other thereto from a source 74. It is also driven at a speed determined by a variable resistance 73'.

The drum has odd numbered contacts 75, 77, 79, 81, 83, and 85, which may be referred to as "On" contacts since they are positioned longitudinally of the drum to engage stationary contacts 75', 77', 79', 81', 83', and 85', respectively. This engagement completes circuits to the gate electrodes $g$ of the control rectifiers 2 and 3 in the various equipments 50, 60, 70, etc., thereby to energize in succession the windings 63, 64, 65, etc., of the motors 32, 33, 34, etc.

Similarly, the drum has even numbered, or "Off" contacts 76, 78, 80, 82, 84, and 86 spaced with respect to corresponding On contacts to deenergize the respective motor field windings 63, 64, 65, etc. All contacts on the drum are connected together and through conductor 69 to the positive terminal of the source of operating potential.

That is, if we assume that the drum is rotating in the direction indicated by the arrow 91, when On contact 75 engages stationary contact 75', the control rectifiers 2 and 3 in equipment 50 become conductive and energize winding 63 in all of the motors 32, 33, 34 etc. This winding remains energized until Off contact 76 engages contact 76' which occurs after contact 75 has disengaged contact 75'. This engagement of contacts 76 and 76' energizes winding 9 in equipment 50, causing deenergization of the respective coil 63 in the different motors. Some little time is involved in reversing the flux in reactors 6 so the deenergization of the previously energized coil actually takes place after initial contact between contacts 76 and 76'.

It will be noticed that the On contacts 75 to 85 are spaced in succession around the circumference of the drum by about 60°, and that each of them is followed by an adjacent even numbered or Off contact appropriately spaced therefrom. The length of the On contacts is such that the corresponding windings of the motor are energized for a period in excess of 240° since each field winding, when energized, remains energized until after the next Off contact engages its cooperating stationary contact.

It will also be observed that at any instant of time in the rotation of the drum four adjacent windings in all of the motors are energized and the remaining windings are deenergized. The group of energized windings is rotated about the rotor in steps of 60° in the direction and at a speed corresponding to the direction and speed of rotation of the drum, thereby producing a rotating field within the motor and causing rotation, in the corresponding direction, and at a corresponding speed, of the motor.

While I have shown a particular embodiment of my invention, it will, of course, be understood that I do not wish to be limited thereto since modifications may be made both in the circuit arrangement and the instrumentalities employed and I contemplate by the appended claims to cover any such modifications as fall within the true spirit and scope of my invention.

What I claim as new and desire to secure by Letters Patent of the United States is:

1. In combination, a controlled unilateral conducting device, a load, and a second controlled unilateral conducting device, all in series connection in that order, said unilateral devices being poled in the same direction, and said series connection being adapted for connection across a source of unidirectional operating potential to control said load, said controlled devices being adapted when reendered conductive to remain conductive until operating potential is interrupted, a saturable reactor having a pair of windings, each winding being in series with a respective condenser across a corresponding unilateral conducting device, whereby when said unilateral conducting devices are nonconducting said load is deenergized and said condensers charge with the same polarity from said source, means to render said unilateral conducting devices conducting whereby said condensers discharge through said windings, said windings being poled in aiding relation with respect to the discharge currents therethrough to saturate said reactor and produce a remanence flux in said reactor after said discharge and said load is energized, and means to reverse said flux thereby to render said unilateral devices non conducting to deenergize said load.

2. In combination, a load device having opposite terminals connected through similarly poled unilateral conducting devices for connection to a source of unidirectional operating potential, said unilateral conducting devices being adapted when rendered conductive to remain conductive until operating potential is interrupted, a saturable reactor having a pair of windings, each winding being connected in series with a condenser across a corresponding one of said unilateral conducting devices, whereby when said devices are nonconducting said condensers charge through said windings, means to render said devices conducting whereby said condensers discharge through said windings, said windings being so poled that currents produced in said windings by discharge of said two condensers aid in saturating said reactor and produces a remanence flux of predetermined direction, and means to reverse the flux in said reactor thereby to produce a reverse electromotive force across said unilateral conducting devices to render them nonconductive.

3. In combination, a rotatable armature, a plurality of field coils about said armature to cause rotation thereof when energized in succession, all of said field coils having a corresponding unilateral conducting device connected in series therewith, said series combinations being adapted for connection across a source of unidirectional electromotive force poled to energize said coil through said device, individual saturable reactors across each of said devices in series with a respective capacitor, whereby when said devices are nonconductive said capacitors charge through said reactors, means to render each of said devices conductive in succession to energize said field coils in succession, whereby said condensers discharge through said reactors and set up remanence flux therein, and means to reverse the flux in each of said reactors in succession at a predetermined time after energization of the respective field coil, thereby to induce a voltage in said reactor, said voltage being poled across the respective unilateral conducting device to interrupt conduction therein, whereby energizing pulses are supplied to said field coils in succession to cause rotation of said armature.

4. In a system for energizing in succession the field coils of a dynamo electric machine to produce a rotating magnetic field therein, the combination of a controlled rectifier in series with each of said field coils, each of said rectifiers having a gate electrode to render it conductive to pass current through the respective field coil in response to positive potential applied to said gate electrode, a saturable reactor connected across each controlled rectifier through a condenser whereby when said rectifier is nonconductive said condenser charges through the corresponding reactor and field coil, means to apply positive pulses to said gate electrodes in succession thereby to render said rectifiers conductive thereby causing discharge of said condensers through said reactors and producing a remanence flux therein, and means to reverse the flux in said reactors thereby to produce a charge in said condensers to render said rectifiers non conductive whereby said field coils are supplied by energizing pulses in succession.

References Cited in the file of this patent

UNITED STATES PATENTS

| 3,015,739 | Manteuffel | Jan. 2, 1962 |
| 3,019,355 | Morgan | Jan. 30, 1962 |
| 3,089,965 | Krezek | May 14, 1963 |

OTHER REFERENCES

Controlled Rectifier Manual, General Electric Co., 1st ed., 1960.